(12) United States Patent
Schnädelbach

(10) Patent No.: US 11,796,032 B2
(45) Date of Patent: Oct. 24, 2023

(54) TORSIONAL VIBRATION DAMPER AND HYDRODYNAMIC TORQUE CONVERTER COMPRISING SAME

(71) Applicant: Schaeffler Technologies AG & Co. KG, Herzogenaurach (DE)

(72) Inventor: David Schnädelbach, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 135 days.

(21) Appl. No.: 17/599,634

(22) PCT Filed: Mar. 10, 2020

(86) PCT No.: PCT/DE2020/100170
§ 371 (c)(1),
(2) Date: Sep. 29, 2021

(87) PCT Pub. No.: WO2020/200356
PCT Pub. Date: Oct. 8, 2020

(65) Prior Publication Data
US 2022/0205509 A1 Jun. 30, 2022

(30) Foreign Application Priority Data

Apr. 5, 2019 (DE) ..................... 10 2019 109 020.2

(51) Int. Cl.
*F16H 45/02* (2006.01)
*F16F 15/123* (2006.01)

(52) U.S. Cl.
CPC ....... *F16F 15/12346* (2013.01); *F16H 45/02* (2013.01); *F16F 15/12353* (2013.01); *F16F 2232/02* (2013.01); *F16F 2236/08* (2013.01); *F16H 2045/0226* (2013.01); *F16H 2045/0263* (2013.01)

(58) Field of Classification Search
CPC ........... F16F 15/12346; F16F 15/12353; F16F 2232/02; F16F 2236/08; F16H 45/02; F16H 2045/0226; F16H 2045/0263
See application file for complete search history.

(56) References Cited

U.S. PATENT DOCUMENTS

| 6,224,487 B1 | 5/2001 | Yuergens | |
|---|---|---|---|
| 10,989,271 B2 * | 4/2021 | Yoshikawa | ......... F16F 15/1478 |
| 2011/0287844 A1 | 11/2011 | Steinberger | |

FOREIGN PATENT DOCUMENTS

| DE | 102010014674 A1 | 11/2010 |
|---|---|---|
| DE | 102011011469 A1 | 9/2011 |

(Continued)

*Primary Examiner* — Huan Le

(57) ABSTRACT

A torsional vibration damper and a hydrodynamic torque converter comprising same is disclosed. The torsional vibration damper has an input part which can be rotated about a rotational axis (d) and an output part. An intermediate flange is arranged against a respective spring device, which acts in a circumferential direction, between the input part and the output part, and the intermediate flange is made of two axially spaced interconnected lateral parts, axially between which the input part and the output part are received. In order to improve the loading of the spring devices, the loading of the spring devices by means of the intermediate flange is at least partly provided by loading means arranged between the lateral parts.

20 Claims, 2 Drawing Sheets

(56) References Cited

FOREIGN PATENT DOCUMENTS

| | | |
|---|---|---|
| DE | 102012205764 A1 | 10/2012 |
| DE | 102017104720 A1 | 9/2017 |
| DE | 102017205815 A1 | 10/2018 |

* cited by examiner

TORSIONAL VIBRATION DAMPER AND HYDRODYNAMIC TORQUE CONVERTER COMPRISING SAME

CROSS-REFERENCE TO RELATED APPLICATIONS

This application is the U.S. National Phase of PCT Appln. No. PCT/DE2020/100170 filed Mar. 10, 2020, which claims priority to DE 102019109020.2 filed Apr. 5, 2019, the entire disclosures of which are incorporated by reference herein.

TECHNICAL FIELD

The disclosure relates to a torsional vibration damper and a hydrodynamic torque converter comprising same, wherein the torsional vibration damper has an input part which can be rotated about a rotational axis and an output part, wherein an intermediate flange is arranged against a respective spring device, which acts in a circumferential direction, between the input part and the output part, and the intermediate flange is made of two axially spaced interconnected lateral parts, axially between which the input part and the output part are received.

BACKGROUND

Generic torsional vibration dampers, for example for hydrodynamic torque converters, are used in drive trains of motor vehicles to isolate torsional vibrations from torsional vibrations of an internal combustion engine subject to torsional vibrations. For example, torsional vibration dampers of this type can be provided between a converter bridging clutch and an output hub and/or between a turbine wheel driven by a pump wheel of the torque converter and the output hub.

The document DE 10 2010 014 674 A1 shows, for example, a hydrodynamic torque converter with a torsional vibration damper arranged within its housing. The torsional vibration damper has an input part connected to a turbine wheel and a converter bridging clutch, an output part connected to an output hub, and an intermediate flange connected in series therebetween by means of spring devices. The intermediate flange carries a centrifugal pendulum.

SUMMARY

The object of the disclosure is to develop a torsional vibration damper of the generic type and a hydrodynamic torque converter therewith. In particular, the object of the disclosure is to design the loading of the spring devices in an advantageous manner.

The object is achieved by the subject matter of the claims and described in the present disclosure. The claims and disclosure further describe advantageous embodiments of the subject matter.

The proposed torsional vibration damper is used for torsional vibration isolation of torsional vibrations in particular in a drive train of a motor vehicle having an internal combustion engine subject to torsional vibrations. In an advantageous embodiment, the torsional vibration damper is integrated into a housing of a hydrodynamic torque converter. The torsional vibration damper contains an input part which can be rotated about a rotational axis and an output part, wherein an intermediate flange is provided between the input part and the output part, which is arranged against a spring device acting in the circumferential direction.

The intermediate flange is formed from two axially spaced, interconnected lateral parts which receive the input part and the output part therebetween. A centrifugal pendulum can be arranged on the intermediate flange to improve the torsional vibration isolation of the torsional vibration damper. The two lateral parts can serve as pendulum mass carriers for pendulum masses distributed over the circumference, for example in an order of two to four. The pendulum masses, for example made of a plurality of sheet metal parts, are arranged axially between the lateral parts. Lateral parts and pendulum masses have axially aligned recesses with raceways on which a pendulum roller axially overlapping the recess rolls.

The input part and the output part can be designed as disk parts formed axially adjacent to one another. A lateral part facing a converter bridging clutch of a hydrodynamic torque converter can be shortened radially on the inside so that a connection such as riveting can be formed between the output part of the converter bridging clutch and the input part of the torsional vibration damper. The input part can be centered on an output hub and the output part can be connected to this output hub in a rotationally fixed manner. For example, the output part and the output hub can be designed in one piece, riveted to one another or connected to one another in a rotationally fixed manner and with axial play by means of internal and external toothing.

Advantageously, the disk parts can have areas of action for the spring devices arranged in one plane. For this purpose, parts of the disk parts can axially overlap and be designed radially one above the other, so that the spring devices, for example designed as helical compression springs, are each acted upon axially centrally by the input part or the output part in relation to their cross-section.

The spring devices can each be formed from linearly designed helical compression springs distributed over the circumference. The helical compression springs can each be housed individually in a captive manner on a circumference. Alternatively, what are termed helical compression spring assemblies can be provided in which a plurality of helical compression springs are nested inside one another as an inner spring and an outer spring. The helical compression springs of a helical compression spring assembly can have different lengths for setting a multi-stage characteristic curve of the torsional force over the angle of rotation of the torsional vibration damper. Different helical compression springs and/or different helical compression spring assemblies can be arranged in the different circumferential directions in relation to the intermediate flange. The helical compression springs can be arranged on different diameters. The helical compression springs of the two spring devices are preferably arranged on the same diameter and alternately over the circumference.

The end faces of the respective helical compression springs that lie opposite the application areas of the input part or the output part in the circumferential direction are loaded by the lateral parts. For this purpose, axially aligned spring windows are provided in the lateral parts of the intermediate flange, into which the helical compression springs or helical compression spring assemblies are inserted in a captive manner and supported radially against centrifugal force. The radial walls of the spring window serve as areas of application of the intermediate flange.

The areas of application of the input part and/or the output part can be planar or have lugs that extend in the circumferential direction and engage in the interior of at least one part of the helical compression springs. The lugs can be designed in such a way that the helical compression spring ends are pulled radially inward during loading and therefore friction between them is prevented or at least reduced radially outward.

When the torsional vibration damper is not loaded, the disk parts preferably have radially outwardly open recesses for the helical compression springs that are axially aligned with the spring windows, with a support that extends across the helical compression spring in the circumferential direction on at least one disk part.

The input part, the intermediate flange and the output part are arranged in series by means of the helical compression springs acting in the circumferential direction, and the input part and the output part can be designed as axially adjacent disk parts, which are arranged between the two axially spaced and interconnected lateral parts of the intermediate flange.

In order to provide reliable loading of the spring devices, in particular independently of the design of the spring devices, their loading by means of the intermediate flange is provided at least partially by loading means arranged between the lateral parts. This means that, alternatively or additionally to at least one of the lateral parts, the spring devices, in particular designed as helical compression springs, can be loaded by means of components arranged axially between these lateral parts. For example, an at least 50% overlap of the cross-sections of all helical compression springs articulated by the intermediate flange can be provided.

In particular, when using nested helical compression springs with external springs with a large diameter and thus lateral parts that are axially spaced apart, reliable loading of the internal springs can be guaranteed by means of the proposed loading means. Here, at least the inner springs can be loaded by the loading means arranged between the lateral parts. The outer springs can be loaded exclusively by the walls of the spring windows receiving them and/or by the loading means arranged between the lateral parts.

The loading means arranged between the lateral parts can be formed at least partially from spacer bolts connecting the lateral parts. The loading means can additionally be formed from at least one lateral part.

The loading means can be formed from sheet metal parts or rivets connected to at least one lateral part. For example, a rivet, such as a stop rivet, which is connected to a lateral part on one side, can be provided on the circumference between two end faces of the helical compression springs that are adjacent in the circumferential direction. Furthermore, sheet metal disks or the like can be connected, for example welded, to a lateral part at this point.

The loading means arranged between the lateral parts can be adapted in the circumferential direction to the end faces of the helical compression springs, for example be designed flat or adapted to a course of the end turn of the helical compression springs.

The proposed hydrodynamic torque converter is used, in particular, in a drive train of a motor vehicle to transmit torque from a crankshaft of an internal combustion engine to a transmission input shaft of a transmission while adjusting possibly different speeds and to increase torque during a start-up phase of the motor vehicle. For this purpose, the torque converter contains a housing with which a pump wheel is integrated in a rotationally fixed manner or can be connected by means of a separate clutch. The pump wheel drives a turbine wheel hydrodynamically. The torque introduced into the torque converter is converted via an output hub that can be or is connected to the turbine wheel, for example transferred to a transmission input shaft of a transmission, for example a multi-stage automatic transmission, in an excessive manner by means of a stator.

To bypass the torque converter, for example after a completed start-up process, a converter bridging clutch integrated into the housing can be provided between the housing and the output hub. A first torsional vibration damping device is provided between the output part of the converter bridging clutch and the output hub. The turbine wheel is rotatably received on the output hub against the effect of a second torsional vibration device, what is termed a turbine damper.

The two torsional vibration damping devices are provided by means of the proposed single torsional vibration damper. Here, the input part of the torsional vibration damper is connected to the output of the converter bridging clutch and the output part is connected to the output hub. The torsional vibration damper has an intermediate flange which is effectively arranged between the input part and the output part by means of a spring device acting in the circumferential direction.

To connect the turbine wheel to the torsional vibration damper, it is connected to the intermediate flange in a rotationally fixed manner, for example riveted and centered on the output hub. To improve the torsional vibration isolation of the torsional vibration damper when the converter bridging clutch is open and closed, a centrifugal pendulum is received on the intermediate flange. The centrifugal pendulum can be matched to a single damper order by designing all pendulum masses of the same type and their pendulum bearings with predetermined pendulum tracks opposite the intermediate flange. Alternatively, two damper arrangements can be provided which are matched to the oscillation modes of the open and closed converter bridging clutch and/or to a different number of cylinders operated by the internal combustion engine. Here, for example, two sets of pendulum masses with different masses and/or different pendulum tracks provided between pendulum mass carriers and pendulum masses by means of a corresponding design of the raceways of the pendulum bearings can be provided. When the converter bridging clutch is closed, the turbine mass can be used as an additional damper mass for the intermediate flange.

BRIEF DESCRIPTION OF THE DRAWINGS

The disclosure is explained in more detail with reference to the exemplary embodiments shown in FIGS. 1 to 3. In the figures.

DETAILED DESCRIPTION

Figure 1:
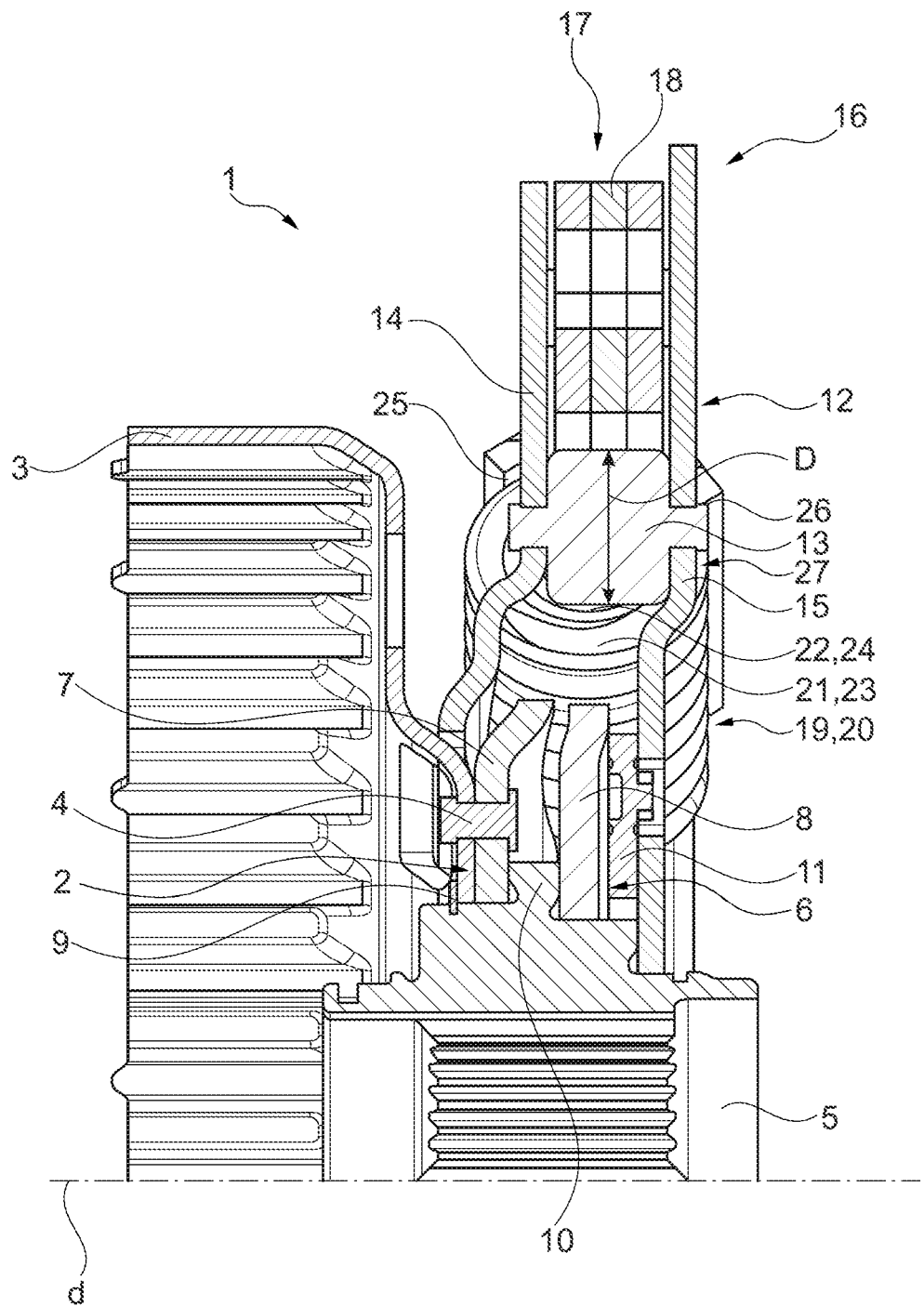
FIG. 1 shows the upper part of a torsional vibration damper arranged to be rotatable about a rotational axis, in section.

FIG. 1 shows the upper part of the torsional vibration damper 1, which can be rotated about the rotational axis d, in section. The input part 2 is connected to the output-side plate carrier 3 of a converter bridging clutch of a hydrodynamic torque converter by means of the rivets 4 distributed over the circumference. The input part 2 is received in a rotatably centered manner on the output hub 5. The output part 6 is non-rotatably connected to the output hub 5. The input part 2 and output part 6 are designed as disk parts 7, 8 arranged parallel to one another. The disk part 7 is axially fixed and rotatably received by means of the locking washer 9 and the ring rim 10 of the output hub 5 and is centered on the output hub 5. The disk part 8 is axially pretensioned between the ring rim 10 and the thrust washer 11 and is held non-rotatably on the output hub 5 by means of a toothing, not shown.

The intermediate flange 12 is formed from the two axially spaced lateral parts 14, 15 connected to one another by means of the spacer bolts 13. The disk parts 7, 8 are axially received between the lateral parts 14, 15 of the intermediate flange 12. The lateral part 14 facing the plate carrier 3 is recessed radially on the inside in order to enable the connection of the plate carrier 3 to the input part 2.

The lateral parts 14, 15 form the pendulum mass carrier 16 of the centrifugal pendulum 17 and receive the pendulum masses 18, which are formed from, for example, riveted sheet metal disks, between them, distributed over the circumference. The pendulum masses 18 are suspended by means of pendulum bearings, not shown, on the pendulum mass carrier 16 in the centrifugal force field of the torsional vibration damper 1 rotating about the rotational axis d so that they can swing along a predetermined pendulum path.

Spring devices 19, 20 are effective between the input part 2, the intermediate flange 12 and the output part 6. The spring devices 19, 20 are arranged in series, i.e., when the input part 2 is rotated relative to the output part 6 about the rotational axis d, depending on the direction of the applied torque, that between the input part 2 and the intermediate flange 12 and that between the intermediate flange 12 and spring devices 19, 20 effectively arranged on the output part 6 are loaded in series.

The spring devices 19, 20 are formed from linear, nested helical compression springs 21, 22, 23, 24, which are arranged distributed over the circumference.

The thrust washer 11, made in particular of plastic and suspended in a rotationally fixed manner in the lateral part 15, limits the axial play of the intermediate flange 12. The intermediate flange 12 is rotatably received and centered on the output hub 5 by means of the lateral part 15. The helical compression springs 21, 22, 13, 24 are housed in the spring windows 25, 26 of the lateral parts 14, 15 in a captive manner and are supported radially on the outside.

The loading of the helical compression springs 21, 22, 23, 24 in the circumferential direction takes place in each case by means of loading means of the disk parts 7, 8 of the input part 2 and the output part 6, which cannot be seen from this sectional view, on one end face of the helical compression springs 21, 22, 23, 24 and on each opposite end face by means of loading means 27 of the intermediate flange 12.

Due to the axially necessary structure and the diameter of the helical compression springs 21, 23 designed as external springs, the spacer bolts 13 arranged between the lateral parts 14, 15 are arranged at the radial height of the helical compression springs 21, 22, 23, 24 and serve as loading means 27 of the intermediate flange 12 to increase the coverage of the cross-sections of the end faces of the helical compression springs 21, 22, 23, 24, for example, to greater than or equal to 50%, and thus to provide sufficient loading thereof. In the exemplary embodiment shown, the radial walls of the spring windows 25, 26 load the outer helical compression springs 21, 23 and only overlap the inner helical compression springs 22, 24. The lateral part 14 is cranked in order to increase the overlap in the area of the cross-section of the helical compression springs 21, 23. To further improve the cover, the spacer bolts 13 are also provided, which load part of the outer helical compression springs 21, 23 and a large part of the inner helical compression springs 22, 24. The diameter D of the spacer bolts 13 is expanded in such a way that it is essentially identical to the radial walls of the spring windows 25, 26. In this way, a planar loading of the helical compression springs 21, 22, 23, 24, in particular the inner helical compression springs 22, 24, is achieved without additional parts outlay.

Figure 2:
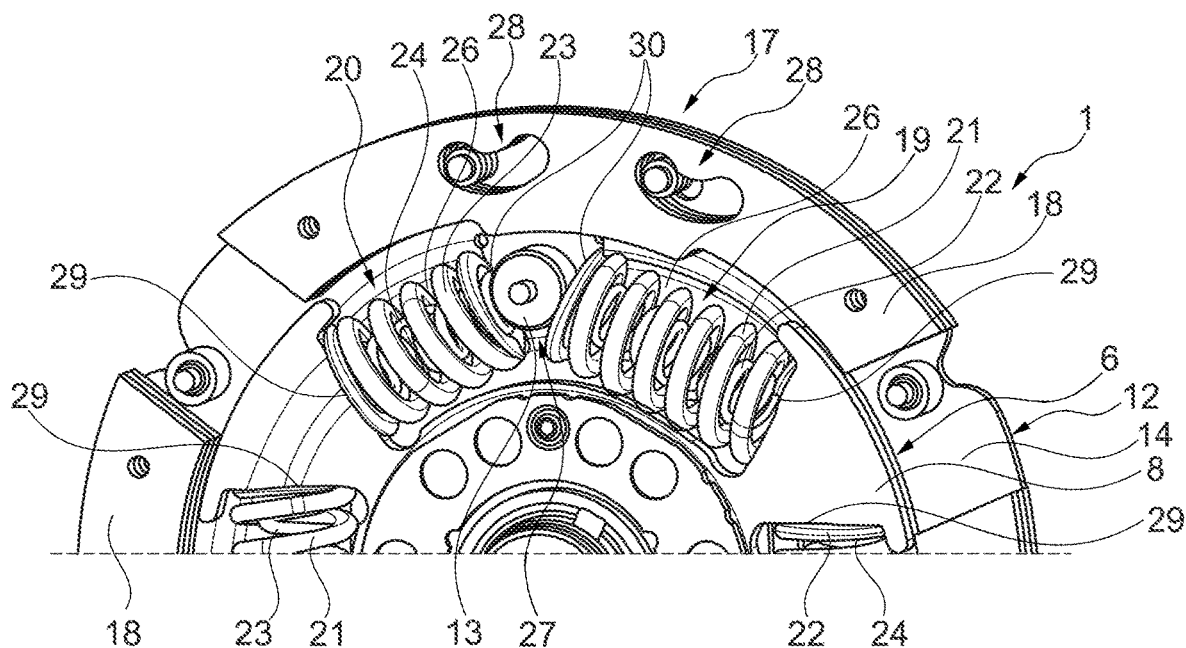
FIG. 2 shows the torsional vibration damper of FIG. 1 in partial view.

FIG. 2 shows the torsional vibration damper 1 of FIG. 1 in a partial view with the front lateral part 14 removed (FIG. 1) and the input-side disk part 7 removed (FIG. 1). The arrangement of the pendulum masses 18 of the centrifugal pendulum 17, which is distributed over the circumference, radially outside the spring devices 19, 20 with the nested helical compression springs 21, 22, 23, 24 can be clearly seen from this illustration. The pendulum masses 18 are received on the intermediate flange 12 in a pendulous manner by means of the pendulum bearings 28.

The helical compression springs 21, 22, 23, 24 are received in the spring windows 26 and are loaded, on the one hand, by the loading means 29 of the disk part 8 of the output part 6 and the non-visible loading means of the disk part 8 of the input part and, on the other hand, by the loading means 27 of the intermediate flange 12. The loading means 27 are formed from the radial walls 30 of the lateral parts 14, 15 (FIG. 1) and the spacer bolts 13.

Figure 3:
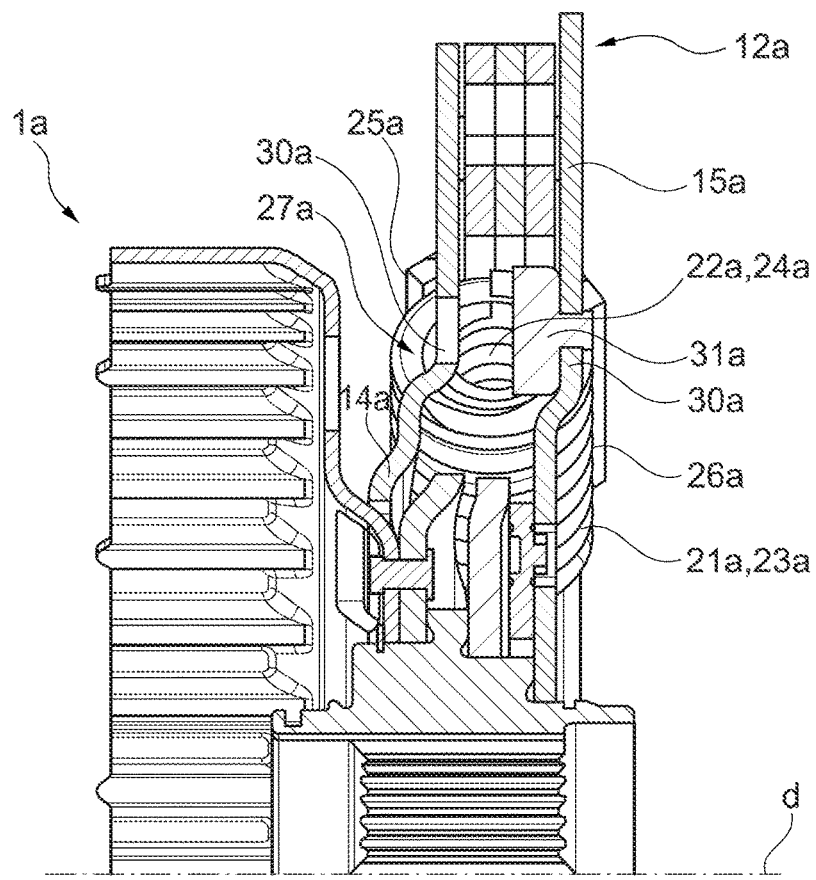
FIG. 3 shows the upper part of a torsional vibration damper modified compared to the torsional vibration damper of FIGS. 1 and 2, in section.

FIG. 3 shows the upper part of the torsional vibration damper 1a arranged about the rotational axis d in section. In contrast to the torsional vibration damper 1 of FIGS. 1 and 2, the loading means 27a of the intermediate flange 12a, in addition to the radial walls 30a of the spring windows 25a, 26a of the lateral parts 14a, 15a forming the intermediate flange 12a, are additionally in the circumferential direction between the spring windows 25a, 26a at radial height of the helical compression springs 21a, 22a, 23a, 24a formed in the lateral part 15a inserted rivets 31a. The lateral part 14a cranked in the area of the wall 30a loads the inner and outer helical compression springs 21a, 22a, 23a, 24a. The lateral part 15a loads the outer helical compression springs 21a. 23a. The rivets 31a introduced into the lateral part 15a each load the inner helical compression springs 22a, 24a. The position of the spacer bolts, not shown, connecting the lateral parts 14a, 15a can be selected outside the diameter of the helical compression springs 21a, 22a, 23a, 24a.

LIST OF REFERENCE NUMBERS

1 Torsional vibration damper
1a Torsional vibration damper
2 Input part
3 Plate carrier
4 Rivet
5 Output hub
6 Output part
7 Disk part
8 Disk part
9 Locking washer
10 Ring rim
11 Thrust washer
12 Intermediate flange
12a Intermediate flange
13 Spacer bolt
14 Lateral part
14a Lateral part
15 Lateral part
15a Lateral part
16 Pendulum mass carrier 17 Centrifugal pendulum
18 Pendulum mass
19 Spring device
20 Spring device
21 Helical compression spring
21a Helical compression spring
22 Helical compression spring
22a Helical compression spring
23 Helical compression spring
23a Helical compression spring
24 Helical compression spring
24a Helical compression spring
25 Spring window
25a Spring window
26 Spring window
26a Spring window
27 Loading means
27a Loading means
28 Pendulum bearing
29 Loading means
30 Wall
30a Wall
31a Rivet
D Diameter
d Rotational axis

The invention claimed is:

1. A torsional vibration damper comprising: an input part which can be rotated about a rotational axis (d) and an output part, an intermediate flange being arranged against a respective spring device, which acts in a circumferential direction, between the input part and the output part, and the intermediate flange being made of two axially spaced interconnected lateral parts, axially between which the input part and the output part are received, wherein a loading of the spring devices by the intermediate flange is at least partly provided by loading means arranged between the lateral parts, wherein the input part and one of the lateral parts are rotatably received on the output hub in a limited rotatable manner, the input part and the one of the lateral parts each contacting, at respective inner diameters thereof, the output hub.

2. The torsional vibration damper according to claim 1, wherein the loading means are additionally formed from at least one of the lateral parts.

3. The torsional vibration damper according to claim 1, wherein the loading means are formed from spacer bolts at least partially connecting the lateral parts.

4. The torsional vibration damper according to claim 1, wherein the loading means are formed from sheet metal parts or rivets connected to at least one lateral part.

5. The torsional vibration damper according to claim 1, wherein spring devices are formed from linearly designed helical compression springs received in spring windows of the lateral parts.

6. The torsional vibration damper according to claim 5, wherein at least one spring device is formed from nested helical compression springs designed as inner and outer springs.

7. The torsional vibration damper according to claim 6, wherein at least the inner springs are loaded by the loading means arranged between the lateral parts.

8. The torsional vibration damper according to claim 5, wherein the loading means arranged between the lateral parts are adapted in the circumferential direction to end faces of the helical compression springs.

9. The torsional vibration damper according to 1, wherein another of the lateral parts includes a recess configured to receive a portion of an output part of a converter bridging clutch.

10. The torsional vibration damper according to 1, wherein the output part is connected to the output hub in a rotationally fixed manner.

11. The torsional vibration damper according to 1, wherein the one of the lateral parts is arranged to be connected to a turbine wheel of a hydrodynamic torque converter.

12. A hydrodynamic torque converter comprising:
a torsional vibration damper, including an input part which can be rotated about a rotational axis (d) and an output part, an intermediate flange being arranged against a respective spring device, which acts in a circumferential direction, between the input part and the output part, and the intermediate flange being made of two axially spaced interconnected lateral parts, axially between which the input part and the output part are received,
wherein a loading of the spring devices by the intermediate flange is at least partly provided by loading means arranged between the lateral parts, and
wherein the torsional vibration damper is operatively arranged within a housing of the hydrodynamic torque converter between an output part of a converter bridging clutch arranged between the housing and an output hub of the hydrodynamic torque converter and the output hub, and the intermediate flange is connected to a turbine wheel driven by a pump wheel connected to the housing,
wherein the input part and one of the lateral parts are rotatably received on the output hub in a limited rotatable manner, the input part and the one of the lateral parts each contacting, at respective inner diameters thereof, the output hub.

13. The hydrodynamic torque converter according to claim 12, wherein the output part is connected to the output hub in a rotationally fixed manner.

14. The hydrodynamic torque converter according to claim 12, wherein the loading means are additionally formed from at least one of the lateral parts.

15. The hydrodynamic torque converter according to claim 12, wherein the loading means are formed from spacer bolts at least partially connecting the lateral parts.

16. The hydrodynamic torque converter according to claim 12, wherein the loading means are formed from sheet metal parts or rivets connected to at least one lateral part.

17. The hydrodynamic torque converter according to claim 12, wherein spring devices are formed from linearly designed helical compression springs received in spring windows of the lateral parts.

18. The hydrodynamic torque converter according to claim 12, wherein another of the lateral parts includes a recess configured to receive a portion of the output part of the converter bridging clutch.

19. The hydrodynamic torque converter according to claim 18, wherein the output part of the converter bridging clutch is connected to the input part in the recess.

20. The hydrodynamic torque converter according to claim 12, wherein the one of the lateral parts is arranged between the output part and the turbine wheel.

* * * * *